US006812308B2

(12) United States Patent
Deviny et al.

(10) Patent No.: US 6,812,308 B2
(45) Date of Patent: Nov. 2, 2004

(54) INITIATOR SYSTEMS AND ADHESIVE COMPOSITIONS MADE THEREWITH

(75) Inventors: Edward J. Deviny, Roseville, MN (US); Dean M. Moren, North Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/348,237

(22) Filed: Jan. 21, 2003

(65) Prior Publication Data

US 2003/0199652 A1 Oct. 23, 2003

Related U.S. Application Data

(63) Continuation of application No. 09/700,933, filed as application No. PCT/US98/12296 on Jun. 12, 1998, now abandoned.

(51) Int. Cl.$^7$ .................................................. C08F 4/52
(52) U.S. Cl. ..................... 526/196; 198/328; 198/329.7; 198/328.5; 198/346; 502/103; 502/200; 502/202; 427/335
(58) Field of Search ................................ 526/198, 328, 526/329.7, 196, 346, 328.5; 502/103, 167, 200, 202; 427/335

(56) References Cited

U.S. PATENT DOCUMENTS

| | | |
|---|---|---|
| 2,985,633 A | 5/1961 | Welch et al. |
| 3,050,505 A | 8/1962 | Litterio |
| 3,141,862 A | 7/1964 | Kirshenbaum et al. |
| 3,275,611 A | 9/1966 | Mottus et al. |
| 3,340,193 A | 9/1967 | Fields et al. |
| 3,418,260 A | 12/1968 | Trofimenko |
| 3,425,988 A | 2/1969 | German et al. |
| 3,451,952 A | 6/1969 | Slocombe |
| 3,476,727 A | 11/1969 | Lo Monaco et al. |
| 3,527,737 A | 9/1970 | Masuhara et al. |
| 3,725,504 A | 4/1973 | Owston |
| 3,829,973 A | 8/1974 | Masuhara et al. |
| 3,832,274 A | 8/1974 | Owston |
| 3,873,640 A | 3/1975 | Owston et al. |
| 3,959,568 A | 5/1976 | Hill, Jr. et al. |
| 4,167,616 A | 9/1979 | Bollinger |
| 4,379,728 A | 4/1983 | Lin |
| 4,485,229 A | 11/1984 | Waddill et al. |
| 4,515,724 A | 5/1985 | Ritter |
| 4,524,181 A | 6/1985 | Adam et al. |
| 4,538,920 A | 9/1985 | Drake |
| 4,638,092 A | 1/1987 | Ritter |
| 4,639,498 A | 1/1987 | Ritter |
| 4,656,229 A | 4/1987 | Chiao |
| 4,676,858 A | 6/1987 | Ritter |
| 4,684,538 A | 8/1987 | Klemarczyk |
| 4,721,751 A | 1/1988 | Schappert et al. |
| 4,731,416 A | 3/1988 | Saunders |
| 4,775,734 A | 10/1988 | Goel |

(List continued on next page.)

FOREIGN PATENT DOCUMENTS

| | | |
|---|---|---|
| AU | 649582 | 10/1993 |
| CA | 664459 | 6/1963 |
| CA | 2061021 | 10/1992 |
| EP | 0 051 796 | 10/1981 |
| EP | 0 040 079 A1 | 11/1981 |
| EP | 0 167 223 | 1/1986 |
| EP | 0 268 985 A2 | 6/1988 |
| EP | 0 435 173 A2 | 7/1991 |
| EP | 0 511 464 A1 | 11/1992 |
| EP | 0 659 859 A1 | 6/1995 |
| EP | 0 335 645 B1 | 8/2002 |

(List continued on next page.)

OTHER PUBLICATIONS

The Trialkylborane-initiated Graft Copolymerization of Methyl Methacrylate onto Hemoglobin, K. Kojima, S. Iwabuchi and K. Kojima, *Bulletin of the Chemical Society of Japan*, vol. 44, pp. 1891–1895 (1971).

A New Method for the Graft Copolyermerization of Methyl Methacrylate onto Proteins and Fibers, *Polymer Letters*, vol. 9, pp. 25–29 (1971).

(List continued on next page.)

*Primary Examiner*—Tatyana Zalukaeva
(74) *Attorney, Agent, or Firm*—Scott A. Bardell

(57) ABSTRACT

Initiator systems of the present invention include both a complexed initiator and a carboxylic acid decomplexer. For example, dicarboxylic acid decomplexer, carboxylic acid ester decomplexers, and monocarboxylic acid decomplexers (preferably those comprising an alkyl group having at least nine carbon atoms for low odor compositions) are useful in the present invention.

12 Claims, No Drawings

*Primary Examiner*—Tatyana Zalukaeva
(74) *Attorney, Agent, or Firm*—Scott A. Bardell

(57) ABSTRACT

Initiator systems of the present invention include both a complexed initiator and a carboxylic acid decomplexer. For example, dicarboxylic acid decomplexer, carboxylic acid ester decomplexers, and monocarboxylic acid decomplexers (preferably those comprising an alkyl group having at least nine carbon atoms for low odor compositions) are useful in the present invention.

12 Claims, No Drawings

U.S. PATENT DOCUMENTS

| | | | |
|---|---|---|---|
| 4,874,814 A | 10/1989 | Cartier et al. | |
| 4,904,360 A | 2/1990 | Wilson, Jr. et al. | |
| 4,920,188 A | 4/1990 | Sakashita et al. | |
| 4,921,921 A | 5/1990 | Ritter | |
| 4,985,516 A | 1/1991 | Sakashita et al. | |
| 5,021,507 A | 6/1991 | Stanley et al. | |
| 5,082,147 A | 1/1992 | Jacobs | |
| 5,106,928 A | 4/1992 | Skoultchi et al. | |
| 5,143,884 A | 9/1992 | Skoultchi et al. | |
| 5,286,821 A | 2/1994 | Skoultchi | |
| 5,310,835 A | 5/1994 | Skoultchi et al. | |
| 5,376,746 A | 12/1994 | Skoultchi | |
| 5,401,805 A | 3/1995 | Chung et al. | |
| 5,512,527 A | 4/1996 | Ritter | |
| 5,539,070 A | 7/1996 | Zharov et al. | |
| 5,599,622 A | 2/1997 | Kinzer et al. | |
| 5,616,796 A | 4/1997 | Pocius et al. | |
| 5,621,143 A | 4/1997 | Pocius | |
| 5,681,910 A | 10/1997 | Pocius | |
| 5,684,102 A | 11/1997 | Pocius | |
| 5,686,544 A | 11/1997 | Pocius | |
| 5,690,780 A | 11/1997 | Zharov et al. | |
| 5,691,065 A | 11/1997 | Zharov et al. | |
| 5,712,331 A | 1/1998 | Ryang | |
| 5,718,977 A | 2/1998 | Pocius | |
| 5,795,657 A | 8/1998 | Pocius | |
| 5,833,208 A | 11/1998 | Lee, Jr. | |
| 5,859,160 A | 1/1999 | Righettini et al. | |
| 5,872,197 A | 2/1999 | Deviny | |
| 5,883,208 A | 3/1999 | Deviny | |
| 5,935,711 A | 8/1999 | Pocius et al. | |
| 5,990,036 A | 11/1999 | Deviny | |
| 6,027,813 A | 2/2000 | Deviny | |
| 6,093,778 A | 7/2000 | Pocius | |
| 6,100,314 A | 8/2000 | Stefan | |
| 6,252,023 B1 | 6/2001 | Moren | |
| 6,384,165 B1 | 5/2002 | Moren | |
| 6,479,602 B1 * | 11/2002 | Moren | 526/196 |

FOREIGN PATENT DOCUMENTS

| | | |
|---|---|---|
| GB | 904403 | 8/1962 |
| GB | 988632 | 4/1965 |
| GB | 1113722 | 5/1968 |
| GB | 1132261 | 10/1968 |
| JP | 45-29195 | 9/1970 |
| JP | 46-16888 | 5/1971 |
| JP | 48-18928 | 6/1973 |
| JP | 53-102394 | 9/1978 |
| JP | 62-288675 | 12/1987 |
| JP | 3-177470 | 8/1991 |
| JP | 3229777 | 10/1991 |
| JP | 3-264509 | 11/1991 |
| JP | 93-235089 | 9/1993 |
| JP | A-7-138544 | 5/1995 |
| JP | A-8-134408 | 5/1995 |
| JP | A-7-138542 | 5/1996 |
| WO | WO 93/23472 | 11/1993 |
| WO | WO 97/07171 | 2/1997 |
| WO | WO 97/17383 | 5/1997 |
| WO | WO 98/12296 | 3/1998 |
| WO | WO 98/17694 | 4/1998 |
| WO | WO 98/30645 | 7/1998 |
| WO | WO 99/64475 | 12/1999 |
| WO | WO 99/64528 | 12/1999 |
| WO | WO 00/56779 | 9/2000 |
| WO | WO 01/32716 | 5/2001 |

OTHER PUBLICATIONS

The Grafting of Methyl Methacrylate onto Cotton by Tri–n–butylborane, K. Kojima, S. Iwabuchi, K. Murakami, K. Kojima and F. Ichikawa, *Journal of Applied Polymre Science,* vol. 16, pp. 1139–1148 (1972).

Grafting of Vinyl Monomers by Tri–n–Butylborane onto Chlorophyll and Related Compounds, *Polymer Letters Edition,* vol. 13, pp. 361–363 (1975).

Tributylborane–Initiated Grafting of Methyl Methacrylate onto Chitin, K. Kojima, M. Yoshikuni and T. Suzuki, *Journal of Applied Polymer Science,* vol. 24, pp. 1587–1593 (1979).

Grafting of Methyl Methacrylate onto Silk Fibers Initiated by Tri–n–Butylborane, M. Tsukada, T. Yamamoto, N. Nakabayashi, H. Ishikawa and G. Freddi, *Journal of Applied Polymer Science,* vol. 43, pp. 2115–2121 (1991).

Molecular Weight Distribution of the Methyl Methacrylate (MMA) Polymer Separated from the MMA–Grafted Silk Fiber, M. Tsukada, Y. Goto, G. Freddi, T. Yamamoto and N. Nakabayashi, *Journal of Applied Polymer Science,* vol. 44, pp. 2197–2202 (1992).

Synthesis of Functionalized Polypropylene and Polypropylene–Polymethylmethacrylate Graft Copolymer, D. Rhubright and T.C. Chung, Proceedings of the American Chemical Society, *Polymeric Materials Science and Engineering,* vol. 67, pp. 112–113 (1992).

Polymerization of Acrylonitrile in Presence of Tributylborine, G. Kolesnikov and L. Fedorova, translated from *Bull. Acad. Sci. USSR. Div. Chem. Sci.,* p. 236 (1957).

Tributylborine: A Catalyst for the Polymerization of Unsaturated Compounds, G. Kolesnikov and N.V. Klimentova, translated from *Bull. Acad. Sci. USSR. Div. Chem. Sci.,* p. 666 (1957).

Triethylboron as an Initiator for Vinyl Polymerization, J. Furukawa, T. Tsuruta and S. Inoue, *Journal of Polymer Science,* vol. XXVI, Issue No. 113, pp. 234–236 (1957).

Oxygen Compounds as Cocatalyst for Triethylboron–Catalyzed Vinyl Polymerization, J. Furukawa and T. Tsuruta, *Journal of Polymer Science,* vol. XXVIII, Issue No. 116, pp. 227–229 (1958).

Mechanism of the Polymerization of Acrylonitrile in Presence of Tributylborine, G. Kolesnikov and L. Fedorova, translated from *Bull. Acad. Sci. USSR. Div. Chem. Sci.,* p. 906 (1958).

Mechanism of Trialkylboron Initiated Polymerization, J. Fordham and C. Sturm, *Journal of Polymer Science,* vol. XXXIII, No. 126, pp. 503–504 (1958).

Cocatalytic Activity of Some Metal Salts on Vinyl Polmerization with Tributhylboron, I.M. Panayotov, *Comptes rendus de l'Academie bulgare des Sciences,* vol. 14, No. 2, pp. 147–150 (1961).

Polymerization with Organoboron Compounds, F. Arimoto, *Journal of Polymer Science: Part A–1,* vol. 4, pp. 275–282 (1966).

On the Existence of a Free–Radical Organoboron Complex in the Polymerization of Methyl Methacrylate, R. Kern and J. Schaefer, *Polymer Letters,* vol. 5, pp. 157–162 (1967).

Vinyl Monomer Polymerization Mechanism in the Presence of Trialkylboranes, J. Grotewold, E. Lissi and A. Villa, *Journal of Polymer Science: Part A–1,* vol. 6, pp. 3157–3162 (1968).

Free–Radical Polymerization of Methyl Methacrylate in the Presence of Trialkylboranes, P. Brindley and R. Pearson, *Polymer Letters,* vol. 6, pp. 831–835 (1968).

Ethylene Polymerization in Presence of Tributylboron, G. Kolesnikov and T. Soboleva, *Scientific and Research Publications of the Members of the All Union Chemical Society Name After Mendilev*, vol. 2, p. 663 (1957).

Studies on Dental Self–Curing Resins (II), S. Fujisawa, Y. Imai and E. Masuhara, *Reports of the Insitute for Medical & Dental Engineering*, vol. 3, pp. 64–71 (1969).

Free–Radical Copolymerization of 1,2–Dichloroethylenes. Evidence for Chain Transfer by Chlorine Atom Elimination, T. Dawson, R. Lundberg and F. Welch, *Journal of Polymer Science: Part A–1*, vol. 7, pp. 173–181 (1969).

Mechanism of Vinyl Monomer Polymerization in the Presence of Trialkylboranes and Inhibitors, E. Aranchibia et al., *Journal of Polymer Science: Part A–1*, vol. 7, pp. 3430–3433 (1969).

Polymerization of Methyl Methacrylate by Trialkylborane–Pyridine System, K. Kojima et al., *Polymer Letters*, vol. 8, pp. 541–547 (1970).

Polymerization Initiated by Triethylborane–Peroxide Mixtures, E. Abuin et al., *Polymer Letters*, vol. 7, pp. 515–518 (1970).

Polymerization of Methyl Methacrylate by Co–ordination Compounds of Tri–n–butylborane with Some Electron–donating Compounds, Kojima et al., *Research Report of the Chiba University Faculty of Engineering*, vol. 22, No. 41, pp. 47–55. (English Abstract).

Polymerization of Methyl Methacrylate Initiated by Tri–n–butylborane–Organic Halide Systems, M. Yoshikuni, M. Asami, S. Iwabuchi and K. Kojima, *Journal of Polymer Science*, vol. 11, pp. 3115–3124 (1973).

Polymerization of Methyl Methacrylate Initiated by Tributylborane–Pyridine System, Kojima et al., *Journal of the Japanese Chemical Society*, No. 11, pp. 2165–2171 (1972). (English Abstract).

The Copolymerization of Vinylhydroquinone and Acrylonitrile by Tri–n–butylborane, S. Iwabuchi, M. Ueda, M. Kobayashi and K. Kojima, *Polymer Journal*, vol. 6, No. 2, pp. 185–190 (1974).

Free Radical Polymerization in the Presence of Triethylborane, E. Abuin, J. Cronejo and E. Lissi, *European Polymer Journal*, vol. 11, pp. 779–782 (1975).

Polymerization of Methyl Methacrylate by tri–n–butylborane in the presence of amino acid esters, K. Kojima, S. Iwabuchi, Y. Moriya and M. Yoshikuni, *Polymer*, vol. 16, pp. 601–604 (1975).

Analysis of Mechanism of Radical Formation Resulted from the Initiator System of Triethylboron and Oxygen by Spin Trapping Technique, Sato et al., *Journal of the Japanese Chemical Society*, No. 6, pp. 1080–1084 (1975). (English Abstract).

Development of Adhesive Pit and Fissure Sealants Using a MMA Resin Initiated by a Tri–n–butyl Borane Derivative, N. Nakabayashi and E. Masuhara, *Journal of Biomedical Materials Research*, vol. 12, pp. 149–165 (1978).

Vinyl Acetate Polymerization Initiated by Alkylborane–oxidizer–type Systems, S. Ivanchev, L. Shumnyi and V. Konovalenko, *Polymer Science U.S.S.R.*, vol. 22, No. 12, pp. 3000–3006 (1980).

Preparation of Hard Tissue Compatible Materials: Dental Polymers, N. Nakabayashi and E. Masuhara, *Biomedical Polymers*, pp. 85–111 (1980).

Mechanism of Initiation of Polymerization of Vinyl Monomers by Means of the Trialkylborane–Acid System, S. Ivanchev and L. Shumnyi, translated from Doklady Akademii Nauk SSSR, vol. 270, No. 5, pp. 1127–1129 (1983).

Effect of Organic Bases on Initiating Properties in the System Boronalkylelemental Organic Peroxide During Vinylchloride Polymerization, T. Guzanova, Master Thesis of the Fifth (graduate) year student, Ministry of High and Secondary Special Education Russia, Gorky State University (1983).

Application of Spin Trapping Technique to Radical Polymerization, 20, T. Sato, N. Fukumura and T. Otsu, *Makromol. Chem.*, 184, pp. 431–442 (1983).

Importance of Polymerization Initiator Systems and Interfacial Initiation of Polymerization in Adhesive Bonding of Resin to Dentin, Y. Imai, Y. Kadoma, K. Kojima, T. Akimoto, K. Ikakura and T. Ohta, *J. Dent. Res.*, vol. 70, No. 7, pp. 1088–1091 (1991).

Vibrational Analysis by Raman Spectroscopy of the Interface Between Dental Adhesive Resin and Dentin, M. Suzuki, H. Kato and S. Wakumoto, *J. Dent. Res.*, vol. 70, No. 7, pp. 1092–1097 (1991).

Laser–Raman Spectroscopic Study of the Adhesive Interface Between 4–MET/MMA–TBB Resin and Hydroxyapatite or Bovine Enamel, M. Ozaki, M. Suzuki, K. Itoh and S. Wakumoto, *Dental Materials Journal*, vol. 10, No. 2, pp. 105–120 (1991).

Polymerization of Some Vinyl Monomers on Triisobutylboron–Containing Radical Initiators in the Presence of Hydroquinone and Benzoquinone, V. Dodonov and D. Grishin, *High Molecular Compounds*, vol. 35, No. 3, pp. 137–141 (1993). (English Abstract).

Synthesis of PP–g–PMMA, PP–g–PVA and PP–g–PCL Copolymers, D. Rhubright and T. Chung, American Chemical Society, Division of Polymer Chemistry, Papers Presented at the Chicago, Illinois Meeting, vol. 34, No. 2, pp. 560–561 (1993).

Functionalized and Grafted Polyolefin Copolymers Prepared by Tansition Metal Catalysts and Borane Monomers, T. Chung, *Polymer Reprints*, vol. 35, No. 1, pp. 674–675 (1994).

Photochemical Modification of Fluorocargon Resin Surface to Adhere with Epoxy Resin, M. Okoshi, T. Miyokawa, H. Kashiura and M. Murahara, *Mat. Res. Soc. Symp. Proc.*, vol. 334, pp. 365–371 (1994).

Chemical Abstract No. 88532r, *Chemical Abstrcts*, vol. 73, 1970.

Chemical Abstract No. 134385q, *Chemical Abstracts*, vol. 80, 1974.

"Adhesion Problems at Polymer Surfaces" by D.M. Brewis that appeared in *Progress in Rubber and Plastic Technology*, vol. 1, p. 1 (1985)).

*Treatise on Adhesion and Adhesives* (J.D. Minford, editor, Marcel Dekker, 1991, New York, vol. 7, pp. 333 to 435).

*Hydroboranes*, pp. 55–56 (1962).

Nöth H. et al., "$^{11}$B–und $^{14}$ N–Kernresonanzstudien an tetrakoordinierten Bor–Strickstoff–Verbindungen," *Chem. Ber.*, 107 pp. 3070–3088 (1974).

*Polyurethanes: Chemistry and Technology*, vol. XVI, Part I, J.H. Saunders, pp. 160–173 (1962).

\* cited by examiner

INITIATOR SYSTEMS AND ADHESIVE COMPOSITIONS MADE THEREWITH

CROSS REFERENCE TO RELATED APPLICATION

This is a continuation of U.S. application Ser. No. 09/700,933, filed Nov. 21, 2000; now anandoned which was a national stage filing under 35 USC 371 of PCT/US98/12296, filed Jun. 12, 1998, which International Application was published by the International Bureau in English on Dec. 16, 1999, which is herein incorporated by reference.

BACKGROUND

This invention relates generally to systems capable of initiating polymerization. More specifically, the invention relates to initiator systems comprising (1) a complexed initiator and (2) decomplexers. The invention further relates to the use of these systems for initiating polymerization, as well as kits, bonding compositions, and polymerized compositions made therewith, coated substrates prepared therefrom, bonded articles prepared therefrom, and methods of preparing such bonded articles.

Systems for initiating the polymerization of monomers to make adhesive compositions are known in the art. U.S. Pat. Nos. 5,106,928, 5,286,821, and 5,310,835 to Skoultchi et al., for example, describe two-part initiator systems for initiating the polymerization of acrylic monomers. The first part of these two-part systems includes a stable organoborane amine complex and the second part includes an activator. The activator liberates the organoborane compound by removing the amine group, thereby allowing the organoborane compound to initiate the polymerization process. Activators are also sometimes referred to as liberators or decomplexers.

U.S. Pat. No. 5,286,821 to Skoultchi describes that suitable activators for liberating the organoborane compound include aldehydes having the general structure:

R—(CHO)$_x$ wherein R is an alkyl group having 1 to 10 carbon atoms or an aryl group having 6 to 10 carbon atoms and x is 1 to 2. Examples include benzaldehyde; o-, m-, p-nitrobenzaldehyde; 2,4-dichlorobenzaldehyde; p-tolylaldehyde; and 3-methoxy-4 hydroxybenzaldehyde.

U.S. Pat. Nos. 5,310,835 and 5,106,928 describes that suitable activators for liberating the organoborane compound also include organic acids having the structure:

R—COOH wherein R is H, an alkyl group, or an alkenyl group having 1 to 8 carbon atoms. Examples include acrylic acid, methacrylic acid, benzoic acid, and p-methoxybenzoic acid.

Fujisawa, Imai, and Mashuhara also describe a system for initiating the polymerization of methyl methacrylate (See, *Reports of the Institute for Medical and Dental Engineering*, vol. 3, page 64 (1969)). The system comprises a trialkylborane amine complex and an activator such as the chloride of methacrylic or n-butane sulfonic acid, terephthalic acid chloride, benzoyl chloride, p-toluene sulfonic acid chloride, benzene sulfonic acid chloride, methane sulfonic acid chloride, toluene diisocyanate, adipic acid chloride, o-tolyl isocyanate, acetyl chloride, and acetic acid anhydride. The initiator system is reportedly useful in providing fast curing resins for dental applications.

One disadvantage of some of the aforementioned activators, however, is the relatively high odor of the activators and the composition in which they are used. Furthermore, another disadvantage of some of these activators is the relatively high level of mobile activator-amine reaction products (i.e., activator-amine constituents) in resulting adhesives. Typically, activators liberate the organoborane compound by bonding (either covalently or ionically) to the amine to form an activator-amine constituent. Most activator-amine constituents remain in the adhesive composition as mobile constituents that are not incorporated into the polymerized adhesive per se. In general, mobile constituents in adhesive compositions may cause performance problems when, for example, they migrate to the surface of the adhesive thereby disrupting the bond interface. Mobile constituents are also susceptible to attack by solvents, thereby making the adhesive composition less suitable for applications where exposure to solvents is unavoidable.

Recently, it has been disclosed that certain activators are useful for reducing the level of mobile constituents in adhesive compositions polymerized therewith. For example, PCT Publication No. WO97/07171 discloses bireactive decomplexers preferably comprising at least one free-radically polymerizable group and at least one amine-reactive group, preferably an isocyanate group, in the same molecule. The bireactive decomplexers are capable of forming a covalent bond with both acrylic monomers and the amine portion of the organoborane amine complex. Accordingly, the decomplexer is capable of covalently bonding to the liberated amine in the system and also reacting into the adhesive per se.

PCT Publication No. WO97/17383 discloses decomplexers comprising at least one anhydride group. Preferred anhydrides have one of the following structures:

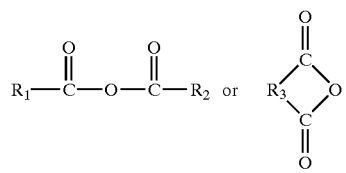

wherein R$_1$ and R$_2$ may independently be an aliphatic group; a cycloaliphatic group; or an aromatic group. R$_3$ is a divalent organic radical that completes a cyclic structure with the anhydride group. It is further preferred that the decomplexer comprises at least one free radically polymerizable group that is capable of forming a covalent bond with an acrylic monomer, such that the decomplexer-amine reaction product is capable of forming covalent bonds with acrylic monomer(s) and can be incorporated into the polymerized adhesive per se.

Such previous systems, however, may experience instability when exposed to hydroxy-functional materials, such as water and 2-hydroxyethyl methacrylate. For example, such hydroxy-functional materials may react with the isocyanate and anhydride functional groups on the decomplexers, resulting in a reduced amount of decomplexer available for activating the initiator systems. Thus, a need exists for further initiator systems that provide improved adhesive compositions, while maintaining low levels of mobile constituents and improved solvent resistance. It is also desirable to provide initiator systems that have relatively low odor.

SUMMARY

Initiator systems of the present invention include both a complexed initiator (e.g., organoborane amine complex) and a carboxylic acid decomplexer. For example, dicarboxylic acid decomplexer, carboxylic acid ester decomplexers, and monocarboxylic acid decomplexers (preferably those comprising an alkyl group having at least nine carbon atoms for low odor compositions) are useful in the present invention.

In one embodiment, an initiator system of the present invention, comprises:

a complexed initiator; and a decomplexer having a structure represented by (I) or (II):

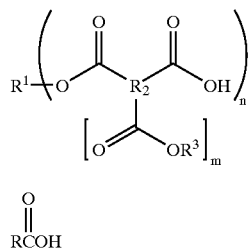

wherein:

$R^1$ is selected from the group consisting of hydrogen, a monovalent organic group, and a multivalent organic group;

$R^2$ is a multivalent organic group;

$R^3$ is selected from the group consisting of hydrogen and a monovalent organic group;

R is a monovalent organic group comprising an alkyl group having at least nine carbon atoms, preferably at least 15 carbon atoms;

m is an integer of 0–2; and n is an integer greater than or equal to one.

In another embodiment, an initiator system of the present invention comprises:

a complexed initiator;

a carboxylic acid decomplexer; and a second decomplexer.

This second decomplexer may be, for example, another carboxylic acid decomplexer, or it may be, for example, an anhydride decomplexer. Particularly preferred anhydride decomplexers are methacrylic anhydride, succinic anhydride, maleic anhydride, and glutaric anhydride.

The decomplexers are useful in kits that comprise a polymerizable composition (which includes the decomplexer(s) and at least one polymerizable monomer) and an initiator component (which includes the complexed initiator and an optional diluent) for polymerizing the polymerizable composition. Such kits are useful for bonding low surface energy substrates. For ease of application, the kits can further comprise a multi-part dispenser.

A method of initiating polymerization of at least one polymerizable monomer comprises the steps of:

providing at least one monomer;

blending the at least one monomer with an initiator system of the present invention; and initiating polymerization of the at least one monomer.

Once the parts of the kit are mixed together, bonding compositions are obtained. The compositions can be at least partially coated onto a substrate, particularly low surface energy substrates.

Once polymerized, a polymerized composition is obtained. The polymerized composition can be, for example, at least partially coated on a substrate or can be used to adhere a first and second substrate together in a bonded article.

DETAILED DESCRIPTION

This invention provides initiator systems capable of initiating polymerization. More specifically, the invention provides "initiator systems" comprising (1) a complexed initiator (e.g., an organoborane amine complex) and (2) a carboxylic acid decomplexer. By utilizing carboxylic acid functional groups on the decomplexers, as compared to previously disclosed anhydride and isocyanate groups, decomplexers of the present invention are typically more stable when exposed to hydroxy-functional materials.

In one aspect of the invention, the initiator system is part of a multi-part kit. Such kits comprise at least a first part (i.e., a polymerizable composition) and a second part (i.e., an initiator component) for initiating polymerization of the polymerizable composition. Most preferably, for ease of use, the kits comprise only two parts. The two parts of the kit may be readily combined in a convenient, commercially useful, whole number mix ratio of 1:10 or less, more preferably 1:4, 1:3, 1:2 or 1:1, such that they can be easily used with multi-part dispensers. Such dispensers are shown in U.S. Pat. Nos. 4,538,920 and 5,082,147 and are available from ConProTec, Inc. (Salem, N.H.) under the trade designation, MIXPAC. The parts of the kit can be readily mixed to form bonding compositions, which readily polymerize to polymers, for example, adhesives.

The "polymerizable composition" typically comprises at least one decomplexer and at least one polymerizable monomer. As described previously, at least one decomplexer is a carboxylic acid decomplexer. Most preferably, the decomplexer is a relatively low odor decomplexer.

"Low odor decomplexers" are those that have at least less odor than methyl methacrylate. Odor can be quantitatively measured using known methods, such as, for example, ASTM D4339-95, "Standard Test Method for Determination of the Odor of Adhesives."

The "initiator component" typically comprises at least one complexed initiator (e.g., organoborane amine complex) and an optional diluent. When mixed with the polymerizable composition, the decomplexer in the polymerizable composition liberates the initiator (e.g., organoborane) from the complexer (e.g., amine), enabling polymerization of the monomer to be initiated.

"Bonding compositions" are those compositions resulting from mixing of the polymerizable composition and the initiator component. The bonding compositions are useful for bonding a wide variety of substrates, including polymers, wood, ceramics, concrete, and metals. The bonding compositions are especially useful for bonding low-surface energy substrates.

"Low surface energy substrates" are those that have a surface energy of less than 45 mJ/m², more typically less than 40 mJ/m² or less than 35 mJ/m². Included among such materials are polyethylene, polypropylene, acrylonitrile-butadiene-styrene, and polyamide. Other polymers of somewhat higher surface energy that may be usefully bonded with the compositions of the invention include polycarbonate and polymethylmethacrylate. However, the invention is not so limited; the compositions may be used to bond any thermoplastic, as well as wood, ceramics, concrete, primed metals, and the like.

"Polymerized compositions" (also referred to as polymers) are those bonding compositions where substantially all of the monomers in the polymerizable composition are polymerized except for a typically unpolymerized amount as recognizable to one of ordinary skill in the art. Polymerized compositions according to the invention may be used in a wide variety of ways, including as adhesives, bonding materials, sealants, coatings, and injection molding resins. They may also be used as matrix resins in conjunction with glass, carbon, and metal fiber mats, such as those used in resin transfer molding operations. They may further be used as encapsulants and potting compounds, such as in the manufacture of electrical components, printed circuit boards, and the like.

Decomplexer

The term "decomplexer" means a compound capable of liberating the initiator (e.g., organoborane) from its complexer (e.g., amine), thereby enabling initiation of the polymerization process. Decomplexers are also sometimes referred to as "activators" or "liberators." As used herein, each of these terms has the same meaning.

In the present invention, the decomplexer has a carboxylic acid group that is capable of forming an ionic bond with the amine portion of the organoborane amine complex to liberate the organoborane compound. Hereinafter, such decomplexers will be referred to as carboxylic acid decomplexers. Examples of such carboxylic acid decomplexers include dicarboxylic acid decomplexers, carboxylic acid ester decomplexers, and monocarboxylic acid decomplexers (preferably those comprising a alkyl group having at least nine carbon atoms for low odor compositions).

Carboxylic acid decomplexers of the present invention preferably have the following general structure (I) or are a monocarboxylic acid decomplexer of structure (II):

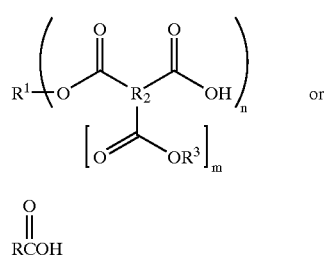

wherein:

$R^1$ is hydrogen, a monovalent organic group (preferably having about 18 atoms or fewer, more preferably about 8 atoms or fewer, excluding hydrogen), or a multivalent organic group (preferably having about 30 atoms or fewer, more preferably about 10 atoms or fewer, excluding hydrogen);

$R^2$ is a multivalent organic group (preferably having about 8 atoms or fewer, more preferably about 4 atoms or fewer, excluding hydrogen);

$R^3$ is hydrogen or a monovalent organic group (preferably having about 18 atoms or fewer, more preferably about 8 atoms or fewer, excluding hydrogen);

R is H or a monovalent organic group (preferably, for relatively low odor decomplexers, R is an alkyl group having at least 9 carbon atoms, more preferably at least about 11 carbon atoms, and most preferably at least 15 carbon atoms—at these levels, low odor compositions may be obtained);

m is an integer of 0–2; and n is an integer greater than or equal to one, preferably 1–4, more preferably 1–2.

In general, advantageously, the decomplexers of structure (I) and the preferred decomplexers of structure (II) are low odor.

More preferably, m is 0 and carboxylic acid decomplexers of structure (I) are represented by the following general structure (III):

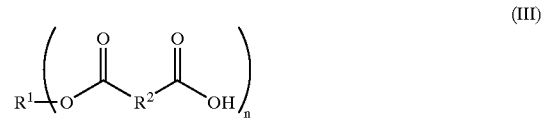

wherein $R^1$, $R^2$, and n are as defined previously.

The terms "monovalent organic group" and "multivalent organic group" mean an organic moiety wherein the available valencies are on carbon atoms. Monovalent organic groups have one available valency. Accordingly, multivalent organic groups have more than one available valency.

The "organic groups" can be aliphatic groups or cyclic groups. In the context of the present invention, the term "aliphatic group" means a saturated or unsaturated, linear or branched, hydrocarbon group. This term is used to encompass alkylene, alkenylene, alkynylene, alkyl, alkenyl, and alkynyl groups, for example. The term "alkyl group" means a monovalent, saturated, linear or branched, hydrocarbon group (e.g., a methyl, ethyl, isopropyl, t-butyl, heptyl, dodecyl, octadecyl, amyl, or 2-ethylhexyl group, and the like). The term "alkylene" means a multivalent, saturated, linear or branched hydrocarbon group. The term "alkenyl group" means a monovalent, unsaturated, linear or branched, hydrocarbon group with one or more carbon-carbon double bonds (e.g., a vinyl group). The term "alkenylene" means a multivalent, unsaturated, linear or branched, hydrocarbon group with one or more carbon-carbon double bonds. The term "alkynyl group" means a monovalent, unsaturated, linear or branched, hydrocarbon group with one or more carbon-carbon triple bonds. The term "alkynylene" means a multivalent, linear or branched, hydrocarbon group with one or more carbon-carbon triple bonds.

The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mononuclear aromatic hydrocarbon group or polynuclear aromatic hydrocarbon group.

Organic groups or organic linking groups, as used herein, can include heteroatoms (e.g., O, N, or S atoms), such as in the case of heterocyclic groups, as well as functional groups (e.g., carbonyl groups).

Decomplexers of structures (I and III) are preferred due to their generally higher solubility in other components of the polymerizable composition. For structure (I), when, $R^1$ is an aliphatic group, n is one, and m is zero, the decomplexers are ester acids (i.e., carboxylic acid ester decomplexers). Examples of useful ester acids include: 1,2-ethylene bismaleate, 1,2-propylene bismaleate, 2,2'-diethyleneglycol bismaleate, 2,2'-dipropyleneglycol bismaleate, and trimethylolpropane trismaleate.

When, $R^1$ is hydrogen, m is zero, and n is one, the decomplexers are diacids (i.e., dicarboxylic acid decomplexers). Examples of useful diacids include: oxalic acid, malonic acid, succinic acid, glutaric acid, adipic acid, maleic acid, fumaric acid, phthalic acid, isophthalic acid and terephthalic acid. Glutaric acid, fumaric acid, and maleic acid are most preferred.

When both $R^1$ and $R^3$ are hydrogen and both m and n are one, the decomplexers are triacids (i.e., tricarboxylic acid decomplexers). An example of a useful triacid is trimellitic acid.

Initiator systems and polymerizable compositions of the invention can include more than one type of decomplexer. For example, the initiator systems and polymerizable compositions can comprise more than one of the above-described decomplexers and/or other decomplexers, such as those comprising at least one anhydride group described in PCT Publication No. WO97/17383, which is incorporated herein by reference. Of those decomplexers described in PCT Publication No. WO97/17383, particularly useful anhydrides include methacrylic anhydride, succinic anhydride, maleic anhydride, and glutaric anhydride. Preferably, such anhydride decomplexers further comprise at least one free radically polymerizable group that is capable of forming a covalent bond with the monomer(s). Preferably, however, the carboxylic acid decomplexer comprises at least about 50 weight % of the decomplexers used in the present invention. Most preferably, the carboxylic acid decomplexer comprises at least about 80 weight % of the decomplexers used in the present invention.

When the initiator system includes an organoborane amine complex, the decomplexer liberates organoborane from its amine complex by reacting with the amine, thereby removing the organoborane from chemical attachment with the amine. Accordingly, the decomplexer is employed in an effective amount (i.e., an amount effective to promote polymerization by liberating organoborane from its amine complex, but without materially adversely affecting the properties of the ultimate polymerized composition).

As recognizable to one of ordinary skill in the art, larger amounts of decomplexer may permit polymerization to proceed too quickly and, in the case of adhesives, the resulting materials may demonstrate inadequate adhesion to low energy surfaces. However, if not enough decomplexer is used, the rate of polymerization may be too slow and the resulting polymers may not be of adequate molecular weight for certain applications. However, a reduced amount of decomplexer may be helpful in slowing the rate of polymerization if it is otherwise too fast. Thus, within these parameters, the decomplexer is typically provided in an amount such that the ratio of amine-reactive groups in the decomplexer(s) (e.g., acid groups or anhydride groups) to amine groups is in the range of 0.5:1.0 to 3.0:1.0. For better performance, e.g., overlap shear adhesion, after bonding with open times of about five minutes, preferably the ratio of amine-reactive groups in the decomplexer(s) to amine groups is in the range of 0.5:1.0 to 1.0:1.0. It should be noted that the number of amine groups includes both primary and secondary amine groups when the amine is a polyamine.

Complexed Initiator

In general, preferred complexed initiators of the invention are complexes of organoborane and amine, wherein the organoborane is the initiator. Any known complexed initiator, or combinations thereof, may be used, however, as long as the complexing agent (e.g., the amine) is reactive with the decomplexer.

A "complex" is readily understood by one of ordinary skill in the art to be a tightly coordinated salt formed by association of a Lewis acid (e.g., organoborane) and a Lewis base (e.g., amine). Such complexes may be represented by the following general structure (IV):

(IV)

wherein $R^4$ is an alkyl group having 1 to about 10 carbon atoms; $R^5$ and $R^6$ are independently selected from alkyl groups having 1 to about 10 carbon atoms and phenyl-containing groups; and Am represents an amine. Preferably, $R^4$, $R^5$ and $R^6$ are independently selected from alkyl groups having 1 to about 5 carbon atoms. Most preferably, $R^4$, $R^5$ and $R^6$ are the same.

The value of v is selected so as to provide an effective ratio of primary or secondary amine nitrogen atoms to boron atoms in the complex. The ratio of primary or secondary amine nitrogen atoms to boron atoms in the complex should broadly be about 0.5:1 to 4:1, preferably about 1:1.

The amine, Am, may comprise a variety of structures, for example, any primary or secondary amine, polyamine containing a primary or secondary amine, or ammonia. When solvent resistance in the ultimate polymerized acrylic composition is desired, however, Am preferably comprises a polyamine.

Specific initiators include trimethylborane, triethylborane, tri-n-propylborane, triisopropylborane, tri-n-butylborane, triisobutylborane, and tri-sec-butylborane. Specific amines include ammonia, n-butylamine, ethylenediamine, 1,6-hexanediamine, diethylamine, diethylenetriamine, and α,ω-diaminopolypropyleneoxide.

Organoborane amine complexes may be readily prepared using known techniques. Typically, the amine is combined with the organoborane in an inert atmosphere with slow stirring. An exotherm is often observed and cooling of the mixture is therefore recommended. If the ingredients have a high vapor pressure, it is desirable to keep the reaction temperature below about 70° C. to 80° C. Once the materials have been well mixed, the complex is permitted to cool to room temperature (i.e., about 22° C. to about 25° C.). No special storage conditions are required although it is preferred that the complex be kept in a capped vessel in a cool, dark location. Advantageously, the complexes can be prepared in the absence of organic solvents that would later have to be removed, although they could be prepared in solvent if so desired. Solvents used in the preparation of the complexes should, preferably be ones that do not coordinate amines, for example, tetrahydofuran or hexane.

The organoborane amine complex is employed in an effective amount, which is an amount large enough to permit polymerization to readily occur to obtain a polymer (preferably, an acrylic polymer). Typically, an effective amount of the organoborane amine complex is an amount that provides about 0.01 weight % boron to about 1.5 weight % boron, more preferably about 0.01 weight % boron to about 0.60 weight % boron, most preferably about 0.02 weight % boron to about 0.50 weight % boron, based on the total weight of the bonding composition, less the weight of fillers, non-reactive diluents, and other non-reactive components.

Diluent

The initiator component may also contain any suitable diluent, or combination thereof, such as an aziridine-functional material. For example, such diluents are described in PCT Publication No. WO 98/17694. Quite advantageously, when used, the organoborane amine complex is carried by (e.g., dissolved in or diluted by) an aziridine-functional material or a blend of two or more different aziridine-functional materials in the initiator component. Generally, the aziridine-functional material should not be reactive toward the complex and functions as an extender for the complex. Also advantageously, the aziridine-functional material may generally increase the spontaneous combustion temperature of the initiator component.

An "aziridine-functional material" refers to an organic compound having at least one aziridine ring or group,

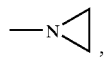

the carbon atom(s) of which may optionally be substituted by short chain alkyl groups (e.g., groups having 1 to about 10 carbon atoms, preferably methyl, ethyl or propyl), so as to form, for example, methyl, ethyl or propyl aziridine moieties.

Examples of useful, commercially available polyaziridines include those available under the following trade designations: CROSSLINKER CX-100 (from Zeneca Resins; Wilmington, Mass.), XAMA-2 (from EIT, Inc.; Lake Wylie, S.C.); XAMA-7 (from EIT, Inc.; Lake Wylie, S.C.), and MAPO (tris [1-(2-methyl) aziridinyl] phosphine oxide (from Aceto Chemical Corporation; Flushing, N.Y.).

The aziridine-functional material should be generally soluble in monomers included in the polymerizable composition, such that the parts of the kit can be readily mixed. By "soluble" is meant that no evidence of gross phase separation at room temperature (i.e., about 22° C. to about 25° C.) is visible to the unaided eye. Similarly, the organoborane amine complex should also be soluble in the aziridine-functional material, although slightly warming a mixture of the complex and the aziridine-functional material may be helpful in forming a solution of the two at room temperature (i.e., about 22° C. to about 25° C.). Accordingly, preferably, if used, the aziridine-functional material is a liquid at or near room temperature (i.e., within about 10° C. of room temperature) or forms a liquid solution with the organoborane amine complex at or near room temperature.

The aziridine-functional material is used in an effective amount. Generally, this is an amount of not more than about 50 weight %, preferably not more than about 25 weight %, more preferably not more than about 10 weight %, based on the total weight of the bonding composition.

Monomers

As stated previously, the initiator system of the invention can be used to initiate the polymerization of any suitable monomer(s). Broadly, the polymerizable composition includes at least one ethylenically unsaturated monomer capable of free radical polymerization. Numerous compounds containing ethylenic unsaturation can be used in the polymerizable composition. Preferably, the composition includes at least one (meth)acrylic monomer, most preferably a methacrylic monomer. Particularly preferred are (meth)acrylic acid derivatives, such as those including esters and/or acid amides. Suitable are, for example, the (meth)acrylic esters of monohydric alcohols, particularly alkanols having from 1 to 12 carbon atoms, such as methyl (meth)acrylate, ethyl (meth)acrylate, butyl (meth)acrylate, and ethylhexyl (meth)acrylate; the (meth)acrylic acid esters of polyhydric alcohols, such as ethylene glycol, diethylene glycol, polyethylene glycol, and trimethylol propane; the di- and mono(meth)acrylic acid esters of glycerin; the di(meth)acrylic acid esters of triethylene glycol and tetraethylene glycol; the di(meth)acrylic acid esters of dipropylene glycol, tripropylene glycol, tetrapropylene glycol and pentapropylene glycol; and the di(meth)acrylic esters of ethoxylated or propoxylated diphenylolpropane.

Basically suitable are also polymerizable monomers, such as vinyl acetate; vinyl halides, such as vinyl chloride, vinyl fluoride, vinyl bromide; styrene; and divinyl-benzene. These compounds, however, are generally used only in subordinate amounts in the polymerizable compositions.

Further suitable are acid amides, such as: acrylamide, N-methyl acrylamide, N-methyl methacrylamide, N,N-dimethyl acrylamide, N,N-dimethyl methacrylamide, N-ethyl methacrylamide, N,N-diethyl acrylamide, N,N-diethyl methacrylamide, N-isopropyl acrylamide, N-butyl acrylamide, N-butyl methacrylamide, N-t-butyl acrylamide, N,N-dibutyl methacrylamide, N-phenyl acrylamide, N-(acryloyl)morpholine, N-(acryloyl)piperidine, N-(methacryloyl)piperidine, N-(1,1-dimethyl-3-oxobutyl)-acrylamide, N-1,1,3,3-tetramethylbutyl acrylamide, dimethylene-bis-(meth)acrylamide, tetramethylene-bis-(meth)acrylamide, trimethylhexamethylene-bis-(meth)acrylamide, tri(meth)acryloyldiethylenetriamine and similar compounds.

In general, the emphasis is on monomers with one or two olefinic double bonds in the molecule, preferably one olefinic double bond. The additional use of higher unsaturated components is not excluded, but it must be kept in mind that their presence can lead to embrittling of the polymerized compositions.

Additives

Bonding compositions of the present invention may also comprise further optional additives. Generally, such additives are present in the polymerizable composition of the kit. Thus, the polymerizable composition may further comprise a variety of optional additives.

One particularly useful additive is a thickener, such as medium (about 40,000) molecular weight polybutyl methacrylate that may generally be incorporated in an amount of up to about 50 weight %, based on the total weight of the polymerizable composition. Thickeners may be employed to increase the viscosity of the resulting bonding composition to a more easily applied viscous syrup-like consistency.

Another particularly useful additive is an elastomeric material. These materials can improve the fracture toughness of bonding compositions made therewith, which can be beneficial when, for example, bonding stiff, high yield strength materials (e.g., metal substrates that do not mechanically absorb energy as easily as other materials, such as flexible polymeric substrates). Such additives can generally be incorporated in an amount of up to about 50% by weight, based on the total weight of the polymerizable composition.

Core-shell polymers can also be added to the polymerizable composition to modify spreading and flow properties of the bonding composition. These enhanced properties may be manifested by a reduced tendency for the bonding composition to leave an undesirable "string" upon dispensing from a syringe-type applicator, or sag or slump after having been applied to a vertical surface. Accordingly, use of more than about 20% by weight, based on total weight of the polymerizable composition, of a core-shell polymer additive may be desirable for achieving improved sag-slump resistance.

Small amounts of inhibitors, such as hydroquinone monomethyl ether may be used in the polymerizable compositions, for example, to prevent or reduce degradation of the monomers during storage. Inhibitors may be added in an amount that does not materially reduce the rate of polymerization or the ultimate properties of polymers made therewith. Accordingly, inhibitors are generally useful in amounts of about 100–10,000 ppm based on the total weight of the monomers in the polymerizable composition.

Other possible additives include non-reactive colorants, fillers (e.g., carbon black, hollow glass/ceramic beads, silica, titanium dioxide, solid glass/ceramic spheres, and chalk), and the like. The various optional additives are employed in any amount, but generally amounts that do not significantly adversely affect the polymerization process or the desired properties of polymers made therewith.

Bonding Compositions

The parts of the kits (i.e., the polymerizable composition and the initiator component) are blended as would normally be done when working with such materials. The initiator component is added to the polymerizable composition shortly before it is desired to use the bonding composition.

Once the parts of the kit have been combined to form a bonding composition, the composition should be used quickly, as the useful pot life may be short depending upon the monomers, the amount of the initiator component, the temperature at which the bonding is to be performed, the presence or absence of crosslinking agents, and whether a diluent is used. Preferably, to improve bonding, it is desirable to keep the temperature below about 40° C., preferably below 30° C., and most preferably below about 25° C. Accordingly, the bonding process can be carried out at room temperature (i.e., about 22° C. to about 25° C.).

The bonding composition is applied to one or both substrates to be bonded and then the substrates are joined together with pressure to force excess bonding composition out of the bond line. This also has the advantage of displacing bonding composition that has been exposed to air and that may have begun to oxidize. In general, the bonds should be made shortly after the bonding composition has been applied to the substrate(s), preferably within about 10 minutes. The typical bond line thickness is about 0.1 to 0.3 millimeters.

The bonds may cure (i.e., polymerize) to a reasonable green strength, i.e., to permit handling of such bonded articles within about 2–3 hours. Full bond strength will generally be reached in about 24 hours under ambient conditions. However, post-curing with heat may be used, if desired.

In one preferred embodiment, the bonding compositions are coated on a low surface energy substrate. In another preferred embodiment, bonded articles comprise a first substrate and a second substrate (preferably at least one of which is a low surface energy polymeric material) adhesively bonded together by a layer of a bonding composition according to the invention.

The invention will be more fully appreciated with reference to the following nonlimiting examples. These examples are merely for illustrative purposes only and are not meant to be limiting on the scope of the appended claims. All parts, percentages, ratios, etc. in the examples and the rest of the specification are by weight unless indicated otherwise.

EXAMPLES

Overlap Shear Bond Strength Test Method

Each bonding composition was applied directly onto an untreated 2.5 cm×10 cm×0.3 cm (1 inch×4 inch×0.125 inch) test panel (for Examples 1–64, 0.2 millimeter (8 mil)-diameter glass bead spacers were added to the bonding composition, except as otherwise indicated) and a bare second test panel was either immediately (or after 5 minutes elapsed time, as noted in select examples) placed against the bonding composition on the first test panel so that the overlapped area was 1.3 cm×2.5 cm (0.5 inch×1 inch). A clamp was applied to the overlapped area for Examples 1–64. A 454-gram weight was applied to the overlapped area for Examples 65–78. The test panels were either high-density polyethylene (HDPE) or polypropylene (PP), both commercially available from Cadillac Plastic; Minneapolis, Minn. A small amount of bonding composition squeezed out of the overlapped area and was allowed to remain.

The bonds were allowed to cure for at least 48 hours at 22° C., for Examples 1–64 or for 24 hours at 22° C. for Examples 65–78. The clamps/weights were then removed, and the overlap bonds were tested in shear (OLS) on a tensile tester at a crosshead speed of 1.27 cm/minute (0.5 inch/minute). The overlap shear values were recorded in pounds and converted into pounds per square inch (psi) and megapascals (MPa).

Peel Bond Strength Test Method

Each formulation was tested on two different polyolefin film substrates: 0.8 mm (30 mil)-thick high-density polyethylene (HDPE), commercially available from Cadillac Plastics; Minneapolis, Minn., and 0.4 mm (15 mil)-thick skived ultrahigh molecular weight polyethylene (UHMW), commercially available from DeWal Industries; Saunderstown, R.I. Neither of the films had any surface treatment.

The polymerizable composition was combined with the initiator component (comprising a mixture of thickened organoborane amine complex dissolved in the aziridine-functional diluent) and mixed with a spatula for one minute to obtain a bonding composition. The bonding composition was then applied to a 5.1 cm (2 inch)-wide, 15.2 cm (6 inch)-long section of the polyolefin film.

Once the bonding composition was applied to the first film, a second film comprising the same substrate was eased onto the bonding composition using a 1.2 kg (2.7 lb) weighted glass plate. One side of the glass plate was applied to one side of the second film at an angle of about 30 degrees and then gradually lowered to a horizontal position so that the second film was applied incrementally to the first to avoid formation of bubbles in the bonding composition. Sufficient bonding composition was applied to the first film to provide minimum bond dimensions of 2.5 cm (1 inch) in width by 3.8 cm (1.5 inch) in length.

The bonded adherends were allowed to cure for 24 hours at room temperature (i.e., about 22° C. to about 25° C.) such that the bonding composition cured to an adhesive. The samples were then tested for bond strength in the T-peel mode using a tensile tester set at a crosshead speed of 10.2 cm/min (4 inches/min). Two overlapping free ends of the sample were clamped into the jaws of the tensile tester, one free end in the upper jaw and one free end in the lower jaw. The jaws were then pulled apart until at least 2.5 cm (1 inch) of adhesive was exposed or until adherend failure was observed. The average force per width during the run after the adhesive was initially exposed was recorded as the peel strength in pounds/inch width (piw) and converted to Newtons/cm (N/cm).

The tensile strengths of the UHMW and HDPE films were found to be 44 N/cm width (25 pound/inch width) and 189 N/cm width (108 pounds/inch width), respectively. Preferably, the peel strength values of the adhesives approximated these tensile strength values. If so, this was an indication of substrate, as opposed to adhesive, failure.

Solvent Resistance

After peel and shear test specimens were prepared, the mixing vial with the remaining bonding composition in it was weighed and this weight was denoted as W1. The vial was capped and the bonding composition was allowed to cure for 24 hours at room temperature (i.e., about 22° C. to about 25° C.). The vial was then filled with tetrahydrofuran (THF) solvent and allowed to stand for several days at room temperature (i.e., about 22° C. to about 25° C.) until the contents looked thoroughly swollen. The swollen mass was subsequently transferred to a 118 milliliter (4 ounce) glass jar and broken up into small chunks with a spatula. The dry glass vial was weighed and this weight was denoted as W2.

Sufficient THF then was added to the glass jar so that the contents comprised less than 5 parts by weight cured adhesive and more than 95 parts by weight THF. The jar was capped and placed on a roll mixer for at least 3 days at room temperature (i.e., about 22° C. to about 25° C.). The fluid mixture was then poured into a conical gauze/paper paint filter having a weight denoted below as W3 and thoroughly rinsed with THF. The filter was dried at 71° C. (160° F.) in a forced air oven for 20 hours.

Then, the filter was allowed to equilibrate for 6 hours at room temperature (i.e., about 22° C. to about 25° C.) before being weighed to give the value denoted below as W4.

Percent of insoluble adhesive solids was then calculated for each sample as follows:

$$\text{Percent Insoluble Solids} = \frac{W4 - W3 + 0.0089}{W1 - W2} \times 100$$

It is noted that a correction factor of 89 milligrams was added to W4−W3 in the equation above to account for that portion of the filter that was lost by virtue of the process conditions. A larger percent insoluble solids is generally indicative of better solvent resistance.

Decomplexers

The following Tables IA–IB illustrate the monocarboxylic and dicarboxylic acid decomplexers utilized in the following examples, along with their equivalent weight and source. Similarly, Table II illustrates the carboxylic acid ester decomplexers. Similarly, Table III illustrates anhydride decomplexers utilized in addition to the carboxylic acid decomplexers in the following examples.

TABLE IA

Monocarboxylic Acid Decomplexers

| Acid | Equiv. Wt. | Source | City/State |
|---|---|---|---|
| Acrylic | 72 | Aldrich Chemical Co. | Milwaukee, WI |
| Methacrylic | 86 | Aldrich Chemical Co. | Milwaukee, WI |
| Undecanoic | 186 | Aldrich Chemical Co. | Milwaukee, WI |

TABLE IB

Dicarboxylic Acid Decomplexers

| Acid | Equiv. Wt. | Source | City/State |
|---|---|---|---|
| Malonic | 52 | Aldrich Chemical Co. | Milwaukee, WI |
| Glutaric | 66 | Aldrich Chemical Co. | Milwaukee, WI |
| Maleic | 58 | Aldrich Chemical Co. | Milwaukee, WI |

TABLE II

Carboxylic Acid Ester Decomplexers

| Acid/Trade Designation | Equiv. Wt. | Source; City, State | Adduct |
|---|---|---|---|
| 2-ethylhexyl maleate | 228 | Dajac; Southampton, PA | Ethyl Hexanol/Maleic Anhydride |
| D-1062 | 214 | Rohm Tech (now Hüls); Somerset, NJ | Hydroxyethyl Acrylate/Maleic Anhydride |

TABLE II-continued

Carboxylic Acid Ester Decomplexers

| Acid/Trade Designation | Equiv. Wt. | Source; City, State | Adduct |
|---|---|---|---|
| A-SA | 219 | Shin-Nakamura; Wakayama City, Japan | Hydroxyethyl Acrylate/ Succinic Anhydride |
| SA | 232 | Shin-Nakamura; Wakayama City, Japan | Hydroxyethyl Methacrylate/ Succinic Anhydride |
| AS-M4 | 250 | Shin-Nakamura; Wakayama City, Japan | Hydroxybutyl Acrylate/ Succinic Anhydride |
| CB-1 | 285 | Shin-Nakamura; Wakayama City, Japan | Hydroxyethyl Methacrylate/ Phthalic Anhydride |
| AS-CL1 | 331 | Shin-Nakamura; Wakayama City, Japan | Caprolactone Acrylate*/ Succinic Anhydride |
| S-CL1 | 361 | Shin-Nakamura; Wakayama City, Japan | Caprolactone Methacrylate*/ Succinic Anhydride |
| FM1A | 324 | Daicel (USA); Fort Lee, NJ | Caprolactone Methacrylate*/ Succinic Anhydride |
| AS-CL2 | 446 | Shin-Nakamura; Wakayama City, Japan | Dicaprolactone Acrylate**/ Succinic Anhydride |
| S-CL2 | 445 | Shin-Nakamura; Wakayama City, Japan | Dicaprolactone Methacrylate**/Succinic Anhydride |
| XM-300 | 492 | Union Carbide; Bound Brook, NJ | Dicaprolactone Acrylate**/ Phthalic Anhydride |

*adduct of hydroxyethyl (meth)acrylate with one mole of caprolactone
**adduct of hydroxyethyl (meth)acrylate with 2 moles of caprolactone

TABLE III

| Type | Equiv. Wt. | Source |
|---|---|---|
| Succinic Anhydride | 50 | Aldrich Chemical Co.; Milwaukee, WI |

Examples 1–6

Decomplexer

A dicarboxylic acid was used as the decomplexer, as indicated in Table IV.

Initiator Component

A 2:1 mole ratio of triethylborane:hexamethylenediamine complex (TEB-HMDA) in the amount of 1.52 grams was dissolved in 3.48 grams trimethylolpropane tris(3-(2-methylaziridino))propionate, commercially available under the trade designation CROSSLINKER CX-100 from Zeneca Resins; Wilmington, Mass. (hereinafter referred to as "CX-100").

Polymerizable Composition

In each case, a slurry containing 10.00 grams core-shell toughener, commercially available from GE Specialty Chemicals; Parkersburg, W. Va. under the trade designation BLENDEX 360, and a solution of the decomplexer in tetrahydrofurfuryl methacrylate (THFMA), commercially available from Aldrich Chemical Co.; Milwaukee, Wis., was allowed to stand at 70° C. for 3 hours. The resultant opaque dispersion was allowed to cool and then sheared aggressively with a saw-toothed blade of a laboratory dispersator, commercially available from Premier Mill Corporation; Reading, Pa. Then, 2-ethylhexyl methacrylate (EHMA), commercially available from Aldrich Chemical Co.; Milwaukee, Wis., was added to the warm dispersion and mixed well.

TABLE IV

| Example | Decomplexer | Weight Decomplexer, grams (milliequiv) | Weight THFMA, grams | Weight EHMA, grams |
|---|---|---|---|---|
| 1 | malonic acid | 1.63 (31.4) | 28.78 | 9.59 |
| 2 | glutaric acid | 2.07 (31.4) | 28.45 | 9.48 |
| 3 | maleic acid | 1.82 (31.4) | 28.64 | 9.54 |
| 4 | malonic acid | 0.82 (15.7) | 29.39 | 9.79 |
| 5 | glutaric acid | 1.04 (15.7) | 29.22 | 9.74 |
| 6 | maleic acid | 0.91 (15.7) | 29.32 | 9.77 |

Adhesive

In each example, the polymerizable composition and initiator component were packaged in a 10:1 volume ratio dual syringe applicator, Kit No. MP-050-10-09, commercially available from ConProTec; Salem, N.H., under the trade designation MIXPAC SYSTEM 50, the larger cylinder holding the polymerizable composition and the smaller cylinder holding the initiator component.

The two parts were combined by simultaneous extrusion through a 10 cm (4 inch) long, 17-static mix nozzle, Part No. MX 4-0-17-5, commercially available from ConProTec Salem, N.H. Overlap shear specimens were prepared and tested according to the Overlap Shear Bond Strength Test Method outlined above. Overlap shear values are given in Table V below and represent the average value of three replicates.

TABLE V

| Example | OLS, PP (immediate bond), MPa (psi) | OLS, HDPE (immediate bond), MPa (psi) | OLS, HDPE (bonded after 5 minutes), MPa (psi) |
|---|---|---|---|
| 1 | 4.52 (656) | 6.03 (875) | 0.785 (114) |
| 2 | 7.45 (1,082) | 6.65 (966) | 2.82 (410) |
| 3 | 7.41 (1,075) | 5.82 (845) | 1.74 (253) |
| 4 | 4.22 (613) | 6.10 (886) | 4.39 (637) |
| 5 | 6.33 (919) | 6.04 (876) | 5.98 (869) |
| 6 | 7.56 (1,097) | 6.41 (930) | 5.77 (837) |

These Examples demonstrate the excellent bond performance on HDPE and PP for adhesives comprising dibasic carboxylic acid decomplexers.

Examples 7–15

Polymerizable compositions and initiator components were prepared using the materials of Example 2, except that the amounts of the components were varied.

TABLE VI

| Example | Weight TEB-HMDA, grams | Weight CX-100, grams | Weight Glutaric Acid, grams (milliequiv) | Weight THFMA, grams | Weight EHMA, grams | OLS, HDPE MPa (psi) | OLS, PP MPa (psi) |
|---|---|---|---|---|---|---|---|
| 7 | 0.12 | 4.88 | 1.04 (15.7) | 29.22 | 9.74 | 0.48 (7) | 0.10 (15) |
| 8 | 0.12 | 4.88 | 2.07 (31.4) | 28.45 | 9.48 | 4.97 (721) | 1.89 (274) |
| 9 | 0.12 | 4.88 | 3.11 (47.1) | 27.67 | 9.22 | 5.26 (763) | 4.58 (665) |
| 10 | 0.50 | 4.50 | 1.04 (15.7) | 29.22 | 9.74 | 3.34 (485) | 3.94 (572) |
| 11 | 0.50 | 4.50 | 2.07 (31.4) | 28.45 | 9.48 | 5.33 (774) | 6.39 (928) |
| 12 | 0.50 | 4.50 | 3.11 (47.1) | 27.67 | 9.22 | 5.32 (772) | 5.67 (823) |
| 13 | 1.50 | 3.50 | 1.04 (15.7) | 29.22 | 9.74 | 5.33 (774) | 7.39 (1,073) |
| 14 | 1.50 | 3.50 | 2.07 (31.4) | 28.45 | 9.48 | 5.32 (772) | 6.22 (903) |
| 15 | 1.50 | 3.50 | 3.11 (47.1) | 27.67 | 9.22 | 5.04 (731) | 6.52 (946) |

These Examples demonstrate the excellent bond performance on HDPE and PP.

Examples 16–19

Decomplexer

A carboxylic acid ester (Ex. 16–17) and/or dicarboxylic acid (Ex. 18–19) was used as the decomplexer. The carboxylic acid ester was prepared as follows:

Preparation of 1,2-ethylene Bismaleate Decomplexing Agent

First, 15.50 grams (0.25 mol) ethylene glycol (commercially available from J T Baker; Phillipsburg, N.J.), 49.00 grams (0.50 mol) maleic anhydride (commercially available from Aldrich Chemical Co.; Milwaukee, Wis.), and 0.04 gram benzyltriethylammonium bromide (commercially available from Aldrich Chemical Co.; Milwaukee, Wis.) were combined with stirring under nitrogen and heated to form a clear, colorless solution. The solution was held at 70° C. for 22 hours, then allowed to cool at room temperature (i.e., about 22° C. to about 25° C.) The product, as determined by proton nuclear magnetic resonance spectroscopy, contained 86 mol % 1,2-ethylene bismaleate, 12 mol % 2-hydroxyethyl maleate, and 2 mol % residual ethylene glycol. This product is hereinafter referred to as "bismaleate."

Initiator Component

To prepare the component, 0.50 gram titanium dioxide, commercially available under the trade designation TIPURE R960 from E.I. DuPont de Nemours; Wilmington, Del., was dispersed in a solution containing 20.00 grams (128 milliequivalents amine) TEB-HMDA, 25.00 grams (152 milliequivalents aziridine) CX-100, and 55.00 grams polyester adipate, commercially available under the trade designation PARAPLEX G40 from C.P. Hall; Chicago, Ill.

Polymerizable Composition

A dispersion containing 177.10 grams BLENDEX 360 and 38.50 grams of a solution of poly(methyl methacrylate), commercially available under the trade designation ELVACITE 2010 from ICI Acrylics; Wilmington, Del., 411.35 grams THFMA, and 137.11 grams EHMA was heated for four hours at 70° C., sheared aggressively with a saw-toothed blade, then gently combined with 38.50 grams ceramic microspheres, commercially available under the trade designation of Z-LIGHT W-1600, 100–350 µm diameter, from Zeelan Industries Inc.; St. Paul, Minn. This polymerizable composition was divided and combined with the various decomplexers listed in Table VII below. Each mixture was heated with stirring for 5 hours at 70° C. to ensure homogeneity.

TABLE VII

| Example | Decomplexer | Weight Decomplexer, grams (milliequiv) | Weight Polymerizable Composition, grams |
|---|---|---|---|
| 16 | Bismaleate | 0.91 (7.0) | 49.09 |
| 17 | Bismaleate | 1.81 (14.0) | 48.19 |
| 18 | Glutaric acid | 0.46 (7.0) | 49.54 |
| 19 | Glutaric acid | 0.93 (14.0) | 49.07 |

Adhesive

In each Example, the polymerizable composition and initiator component were combined and tested as in Examples 1–6, except that glass beads were omitted from the wet adhesive during bond preparation.

TABLE VIII

| Example | OLS, PP (immediate bond), MPa (psi) | OLS, HDPE (immediate bond), MPa (psi) | OLS, HDPE (bonded after 5 minutes), MPa (psi) |
|---|---|---|---|
| 16 | 5.62 (816) | 5.27 (765) | 3.44 (500) |
| 17 | 6.59 (956) | 2.00 (290) | 0.30 (43) |
| 18 | 5.35 (776) | 5.09 (739) | 4.47 (649) |
| 19 | 4.65 (675) | 5.43 (788) | 1.08 (157) |

Example 20

Decomplexer

In this Example, D-1062 decomplexer was used.

Initiator Component

The initiator component of Example 1 was used.

Polymerizable Composition

A slurry containing 10.00 grams BLENDEX 360 and 24.95 grams THFMA stood at 65° C. for 17 hours. The resultant opaque dispersion was allowed to cool and sheared aggressively with a saw-toothed blade. Then, 8.32 grams EHMA and 6.73 grams (31.4 millimol) D-1062 were added to the dispersion and mixed well.

Adhesive

The polymerizable composition and the initiator component were packaged and then tested after immediate bonding as in Example 1.

TABLE IX

| Substrate | OLS, MPa (psi) |
|---|---|
| HDPE | 6.34 (920) |
| PP | 7.84 (1,137) |

Examples 21–30

Adhesives were prepared and tested as in Example 1, but using various monomers in place of the THFMA/EHMA blend. The monomers used, and their amounts are given in Table X.

TABLE X

| | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| Weight isooctyl acrylate (IOA), grams | — | 8.32 | — | — | — | — | — | — | — | — |
| Weight isobornyl acrylate (IBnA), grams | 8.32 | — | — | — | — | — | — | — | — | — |
| Weight THFMA, grams | 24.95 | 24.95 | — | — | — | — | — | — | — | — |
| Weight methyl methacrylate (MMA), grams | — | — | 24.95 | 8.32 | 12.48 | 16.63 | 16.64 | 22.62 | 8.31 | 14.97 |
| Weight n-butyl acrylate (nBA), grams | — | — | 4.16 | — | 4.16 | 8.32 | 16.64 | 10.65 | 13.31 | 8.32 |
| Weight t-butyl acrylate (tBA), grams | — | — | 4.16 | 24.95 | 16.63 | 8.32 | — | — | 11.64 | 11.64 |
| OLS, HDPE, MPa (psi) | 5.44 (789) | 5.52 (800) | 5.57 (808) | 4.98 (723) | 6.17 (895) | 6.05 (878) | 6.60 (957) | 5.18 (752) | 5.90 (855) | 6.57 (953) |
| OLS, PP, MPa (psi) | 6.01 (871) | 6.06 (879) | 7.67 (1,112) | 5.64 (818) | 7.84 (1,137) | 7.36 (1,067) | 7.99 (1,159) | 7.99 (1,159) | 6.54 (949) | 7.51 (1,089) |

Examples 31–36

Adhesives were prepared and evaluated as in Example 20, except that decomplexer D-1062 was replaced at various stoichiometries with other carboxylic acid ester decomplexers: A-SA and SA.

TABLE XI

| | Ex. 31 | Ex. 32 | Ex. 33 | Ex. 34 | Ex. 35 | Ex. 36 |
|---|---|---|---|---|---|---|
| Weight THFMA, grams | 24.91 | 28.67 | 27.34 | 24.61 | 22.02 | 19.36 |
| Weight EHMA, grams | 8.30 | 9.56 | 9.11 | 8.20 | 7.34 | 6.45 |
| Weight A-SA, grams (millimol) | 6.79 (31.4) | — | — | — | — | — |
| Weight SA, grams (millimol) | — | 1.77 (7.7) | 3.55 (15.4) | 7.19 (31.3) | 10.64 (46.3) | 14.19 (61.7) |
| Equiv. Ratio Acid:Total Nitrogen | 1:1 | 0.25:1 | 0.5:1 | 1:1 | 1.5:1 | 2:1 |
| OLS, HDPE, MPa (psi) | 6.54 (949) | 3.51 (510) | 6.68 (969) | 5.73 (831) | 5.91 (858) | 1.36 (197) |
| OLS, PP, MPa (psi) | 6.90 (1,001) | — | — | 7.49 (1,087) | — | — |

Examples 37–41

A solution containing 351 grams MMA, 252 grams nBA, and 270 grams poly(methyl methacrylate-co-ethyl acrylate), commercially available from Aldrich Chemical Co.; Milwaukee, Wis., under catalog #18224-9, was divided, combined with various carboxylic acid ester decomplexers: SA, A-SA, CB-1, XM-300, and D-1062 (31.4 millimol each, providing 1 equiv. acid to equiv. total nitrogen), and evaluated as in Example 20.

TABLE XII

| | Ex. 37 | Ex. 38 | Ex. 39 | Ex. 40 | Ex. 41 |
|---|---|---|---|---|---|
| Weight Bonding Composition | 42.81 | 43.21 | 41.16 | 34.75 | 43.27 |
| Weight SA, grams | 7.19 | — | — | — | — |
| Weight A-SA, grams | — | 6.79 | — | — | — |
| Weight CB-1, grams | — | — | 8.84 | — | — |
| Weight XM-300, grams | — | — | — | 15.25 | — |
| Weight D-1062, grams | — | — | — | — | 6.73 |
| OLS, HDPE, MPa (psi) | 3.27 (475) | 2.37 (344) | 5.57 (809) | 1.66 (241) | 5.66 (822) |
| OLS, PP, MPa (psi) | 3.98 (578) | 2.98 (432) | 4.05 (588) | 3.72 (540) | 7.00 (1,016) |

Examples 42–47

Decomplexer

A carboxylic acid ester was used as the decomplexer. It was prepared as follows:

Preparation of 2-Methacryloyloxyethyl Maleate Decomplexer

First, 260.0 grams (2.0 mol) hydroxyethyl methacrylate, commercially available from Alcolac; Baltimore, Md., 196.0 grams (2.0 mol) maleic anhydride, commercially available from Aldrich Chemical Co.; Milwaukee, Wis., and 0.16 gram benzyltriethylammonium bromide were combined under nitrogen and heated with stirring to form a clear, colorless solution. The solution was held at 70° C. for 42 hours then allowed to cool at room temperature (i.e., about 22° C. to about 25° C.). The product, as determined by proton nuclear magnetic resonance spectroscopy, contained 93 mol % 2-methacryloyloxyethyl maleate.

Initiator component

Three initiator components were used in these Examples: the initiator component of Example 20 and two additional initiator components that were prepared as in Example 20, except at lower TEB-HMDA concentrations. One was prepared at 2.5 weight percent TEB-HMDA in CX-100, the other at 10 weight percent TEB-HMDA in CX-100.

Adhesives

Adhesives were prepared using the polymerizable composition of Example 20, except that the 2-methacryloyloxyethyl maleate decomplexer was used at various stoichiometries in place of D-1062.

TABLE XIII

| | Ex. 42 | Ex. 43 | Ex. 44 | Ex. 45 | Ex. 46 | Ex. 47 |
|---|---|---|---|---|---|---|
| Weight THFMA, grams | 27.32 | 27.32 | 27.32 | 24.63 | 24.63 | 24.63 |
| Weight EHMA, grams | 9.10 | 9.10 | 9.10 | 8.21 | 8.21 | 8.21 |
| Weight 2-methacryloyloxyethyl maleate, grams (millimol) | 3.58 (15.7) | 3.58 (15.7) | 3.58 (15.7) | 7.16 (31.4) | 7.16 (31.4) | 7.16 (31.4) |
| Wt. % TEB-HMDA in CX-100 | 30 | 10 | 2.5 | 30 | 10 | 2.5 |
| Equiv. Ratio Acid:Total Nitrogen | 0.5:1 | 0.5:1 | 0.5:1 | 1:1 | 1:1 | 1:1 |
| OLS, HDPE, MPa (psi) | 6.22 (903) | 5.39 (782) | 4.10 (595) | 4.43 (643) | 3.80 (552) | 5.26 (763) |
| OLS, PP, MPa (psi) | 6.85 (994) | 6.34 (920) | 2.00 (290) | 5.62 (815) | 6.05 (878) | 2.60 (378) |

Examples 48–52

A dispersion containing 178.23 grams THFMA, 59.41 grams EHMA, and 65.0 grams BLENDEX 360 was prepared as in Example 20, except that the carboxylic acid ester decomplexer was excluded. This dispersion was divided, combined with various carboxylic acid ester decomplexers: SA, A-SA, 2-methacryloyloxyethyl maleate (from Examples 42–47), D-1062, and 2-ethylhexyl maleate (15.7 millimol each, providing 0.5 equiv. acid to equiv. total nitrogen) and evaluated as in Example 20.

TABLE XIV

| | Ex. 48 | Ex. 49 | Ex. 50 | Ex. 51 | Ex. 52 |
|---|---|---|---|---|---|
| Weight monomer dispersion, grams | 46.39 | 46.61 | 46.42 | 46.64 | 46.42 |
| Weight SA, grams | 3.61 | — | — | — | — |
| Weight A-SA, grams | — | 3.39 | — | — | — |
| Weight 2-methacryloyloxyethyl maleate, grams | — | — | 3.58 | — | — |
| Weight D-1062, grams | — | — | — | 3.36 | — |
| Weight 2-ethylhexyl maleate, grams | — | — | — | — | 3.58 |
| OLS, HDPE, MPa (psi) | 6.63 (962) | 5.96 (865) | 6.22 (903) | 6.20 (900) | 1.47 (213) |
| OLS, PP, MPa (psi) | 4.93 (716) | 2.14 (311) | 6.85 (994) | 6.29 (913) | 0.39 (57) |

Examples 53–56

Decomplexer

A carboxylic acid ester was used as the decomplexer. It was prepared as follows:

Preparation of Acryloyloxypropyl Maleate Decomplexer

First, 65.0 grams (0.5 mol) hydroxypropyl acrylate, commercially available from Aldrich Chemical Co.; Milwaukee, Wis., 49.0 grams (0.5 mol) maleic anhydride, and 0.04 gram benzyltriethylammonium bromide were combined under nitrogen and heated with stirring to form a clear, colorless solution. The solution was held at 70° C. for 17 hours then allowed to cool at room temperature (i.e., about 22° C. to about 25° C.). The product, as determined by proton nuclear magnetic resonance spectroscopy, contained 86 mol % acryloyloxypropyl maleate.

Initiator Component

First, 5.0 grams (32 milliequivalents amine) TEB-HMDA was dissolved a mixture of 45.0 grams (274 milliequivalents aziridine) CX-100 and 50.0 grams polyester adipate, commercially available under the trade designation PARAPLEX G40 from C.P. Hall; Chicago, Ill.

Polymerizable Composition

First, 16.0 grams ELVACITE 2010 was dissolved in 64 grams THFMA at 70° C. This PMMA solution was divided, combined sequentially with additional THFMA, BLENDEX 360, EHMA, and 3.49 grams (15.3 millimol each, providing 1 equiv. acid to equiv. total nitrogen) acryloyloxypropyl maleate prepared above, following the general procedure of Example 20.

Adhesives

Adhesives were prepared and evaluated as in Example 20, but using the polymerizable composition and initiator component above. The amounts of PMMA solution, monomer, and BLENDEX 360 and the resulting overlap shear values are given in Table XV.

various stoichiometries and various acid to anhydride ratios as tabulated below.

Adhesives

Adhesives were prepared and evaluated as in Example 20, but using the initiator component and polymerizable composition specified above. In addition to testing the compositions for overlap shear, peel bond strength was determined on UHMW test panels using the Peel Strength Test Method described above.

TABLE XVI

|  | Ex. 57 | Ex. 58 | Ex. 59 | Ex. 60 | Ex. 61 | Ex. 62 | Ex. 63 |
|---|---|---|---|---|---|---|---|
| Weight monomer mixture, grams | 49.40 | 49.05 | 48.81 | 48.34 | 47.63 | 49.06 | 49.22 |
| Weight SA, grams | 0.54 | 0.85 | 1.07 | 1.49 | 2.13 | 0.75 | 0.55 |
| (millimol) | (2.3) | (3.7) | (4.7) | (6.5) | (9.3) | (3.3) | (2.4) |
| Weight anhydride decomplexer, grams (milliequiv) | 0.06 | 0.10 | 0.12 | 0.17 | 0.24 | 0.20 | 0.23 |
|  | (1.2) | (2.0) | (2.4) | (3.4) | (4.8) | (4.0) | (4.6) |
| Equiv. Ratio (Acid + Anhydride): Total Nitrogen | 0.25:1 | 0.4:1 | 0.5:1 | 0.7:1 | 1:1 | 0.5:1 | 0.5:1 |
| Weight Ratio Acid:Anhydride | 90:10 | 90:10 | 90:10 | 90:10 | 90:10 | 80:20 | 70:30 |
| OLS, HDPE, MPa | 1.65 | 5.34 | 5.40 | 5.37 | 5.44 | 5.37 | 5.36 |
| (psi) | (152) | (775) | (784) | (780) | (789) | (780) | (778) |
| OLS, PP, MPa | (0) | (771) | (933) | (986) | (879) | (1,162) | (1,064) |
| (psi) | 0 | 5.31 | 6.43 | 6.79 | 6.06 | 8.01 | 7.33 |
| Peel, UHMW, N/cm (piw) | 0.35 | 9.0 | 7.9 | 6.2 | — | 6.0 | 5.6 |
|  | (0.2) | (5.1) | (4.5) | (3.5) |  | (3.4) | (3.2) |

TABLE XV

|  | Ex. 53 | Ex. 54 | Ex. 55 | Ex. 56 |
|---|---|---|---|---|
| Weight PMMA solution, grams | 12.50 | 25.00 | 12.50 | 25.00 |
| Weight additional THFMA, grams | 17.38 | 5.51 | 15.51 | 3.63 |
| Weight EHMA, grams | 9.13 | 8.50 | 8.50 | 7.88 |
| Weight BLENDEX 360, grams | 7.50 | 7.50 | 10.00 | 10.00 |
| OLS, HDPE, MPa (psi) | 5.15 | 5.05 | 5.02 | 4.56 |
|  | (748) | (733) | (729) | (662) |
| OLS, PP, MPa (psi) | 7.02 | 4.93 | 6.74 | 5.30 |
|  | (1,019) | (716) | (978) | (770) |

Examples 57–63

Decomplexer

In these Examples, a combination of two decomplexers was used: a carboxylic acid ester decomplexer (SA) and an anhydride decomplexer (succinic anhydride).

Initiator Component

To prepare this component, 20.0 grams (128 milliequivalents amine) TEB-HMDA was dissolved in a mixture of 25.0 grams (152 milliequivalents aziridine) CX-100 and 55.0 grams polyester adipate, commercially available under the trade designation PARAPLEX G40 from C.P. Hall; Chicago, Ill.

Polymerizable Composition

A dispersion containing 177.10 grams BLENDEX 360 and a solution of 38.50 grams ELVACITE 2010, 411.35 grams THFMA, and 137.11 grams EHMA was heated for four hours at 70° C., sheared aggressively with a sawtoothed blade, then gently combined with 38.50 grams Z-LIGHT W-1600. This monomer mixture was divided and combined with the carboxylic acid ester decomplexers at

Example 64

Decomplexer

In this Example, a combination of two decomplexers was used: a carboxylic acid ester decomplexer (2-methacryloyloxyethyl succinate) and an anhydride decomplexer (succinic anhydride).

Initiator Component

The initiator component of Examples 57–63 was used for this Example.

Polymerizable Composition

A dispersion containing 12.50 grams BLENDEX 360, 25.36 grams THFMA, 8.45 grams EHMA, 1.07 grams (4.7 millimol), 2-methacryloyloxyethyl succinate and 0.12 grams (2.4 milliequivalents) succinic anhydride was heated for four hours at 70° C., sheared aggressively with a sawtoothed blade, then gently combined with 2.50 grams Z-LIGHT W-1600.

Adhesives

Adhesives were prepared and evaluated as in Example 20, except using the above initiator component and polymerizable composition.

TABLE XVII

| OLS, HDPE, MPa (psi) | 5.37 |
|---|---|
|  | (780) |
| OLS, PP, MPa (psi) | 6.46 |
|  | (937) |
| Peel, UHMW, N/cm (piw) | 9.50 |
|  | (5.4) |

Examples 65–78

Decomplexer

In these Examples, a combination of two decomplexers was used: a carboxylic acid ester decomplexer and an anhydride decomplexer (succinic anhydride).

Initiator Component

In all Examples, the initiator component contained by weight, 16% TEB-HMDA, 65% trifunctional, unsubstituted aziridine available under the trade designation XAMA-2 from EIT Inc.; Lake Wylie, S.C., 3% treated, fumed silica available under the trade designation CAB-O-SIL TS-720 from Cabot Corporation; Tuscola, Ill., and 16% surface-treated, floated glass bubbles available under the trade designation SCOTCHLITE A16/500 from Minnesota Mining and Manufacturing Company; St. Paul, Minn. The TEB-HMDA was dissolved in the XAMA-2. Then the CAB-O-SIL TS-720 was stirred in by hand followed by addition of the SCOTCHLITE A16/500 glass bubbles. No attempt was made to remove any entrapped air.

Polymerizable Composition

A slurry was prepared from 50 grams of a premix and 0.505 gram Z-LIGHT W-1600 ceramic microspheres (commercially available from Zeelan Industries Inc.; St. Paul, Minn.). The premix contained 37.5% N,N-dimethylacrylamide (commercially available from Aldrich Chemical Co.; Milwaukee, Wis.), 37.5% ethoxyethyl methacrylate (commercially available from Aldrich Chemical Co., Milwaukee, Wis.), and 25% BLENDEX 360 core-shell toughener (commercially available from GE Specialty Chemicals; Parkersburg, W. Va.), based on total weight of the premix. A 50 gram batch was prepared in a 237 cubic centimeter (8 ounce) glass jar containing 15 steel mixing balls, each of 0.5 inch diameter. After an initial hand mix, the jar was placed on a roll mill for at least 16 hours until the BLENDEX 360 was completely dispersed. The Z-LIGHT W-1600 ceramic microspheres were then added, stirred by hand, and roll mixing was resumed for at least another 16 hours.

The resulting slurry contained 37.13% N,N-dimethylacrylamide, 37.13% ethoxyethyl methacrylate, 24.74% BLENDEX 360, and 1.00% Z-LIGHT W-1600 ceramic microspheres. The slurry was added to a 4-dram glass mixing vial containing the decomplexers. The contents were then thoroughly mixed by hand to provide the polymerizable composition.

The proportion of each substituent in the polymerizable composition is presented in Table XIX, where values are reported in weight %, based on total weight of the bonding composition from which the adhesive is prepared.

TABLE XIX

| Ex. | Dimethyl Acrylamide (DMAc) | Ethoxyethyl methacrylate | BLENDEX 360 | Succinic Anhydride | Carboxylic Acid Decomplexer (A) | Weight % of (A) | Z-LIGHT W-1600 |
|---|---|---|---|---|---|---|---|
| 65 | 36.83 | 36.83 | 24.55 | 0.3214 | Acrylic | 0.479 | 0.9918 |
| 66 | 36.79 | 36.79 | 24.53 | 0.3214 | Methacrylic | 0.573 | 0.9908 |
| 67 | 36.54 | 36.54 | 24.37 | 0.3219 | Undecanoic | 1.239 | 0.9843 |
| 68 | 36.48 | 36.48 | 24.32 | 0.3206 | D-1062 | 1.421 | 0.9825 |
| 69 | 36.47 | 36.47 | 24.31 | 0.3206 | A-SA | 1.454 | 0.9823 |
| 70 | 36.44 | 36.44 | 24.29 | 0.3205 | SA | 1.540 | 0.9812 |
| 71 | 36.39 | 36.39 | 24.26 | 0.3206 | AS-M4 | 1.659 | 0.9800 |
| 72 | 36.31 | 36.31 | 24.20 | 0.3203 | CB-1 | 1.891 | 0.9778 |
| 73 | 36.19 | 36.19 | 24.13 | 0.3204 | AS-CL1 | 2.197 | 0.9747 |
| 74 | 36.12 | 36.12 | 24.08 | 0.3204 | S-CL1 | 2.395 | 0.9728 |
| 75 | 36.21 | 36.21 | 24.14 | 0.3203 | FM1A | 2.149 | 0.9752 |
| 76 | 35.91 | 35.91 | 23.94 | 0.3200 | AS-CL2 | 2.956 | 0.9671 |
| 77 | 35.91 | 35.91 | 23.94 | 0.3202 | S-CL2 | 2.951 | 0.9673 |
| 78 | 35.80 | 35.80 | 23.87 | 0.3199 | XM-300 | 3.259 | 0.9642 |

Adhesives

The polymerizable composition was hand-mixed with the initiator component in a 4-dram vial. Each test sample contained approximately 4.873 grams polymerizable composition and 0.277 gram initiator component. Specific amounts of each component are given in Table XX.

TABLE XX

| Ex. | Wt. Polymerizable Composition (grams) | Wt. Initiator Component (grams) |
|---|---|---|
| 65 | 4.861 | 0.277 |
| 66 | 4.860 | 0.277 |
| 67 | 4.854 | 0.277 |
| 68 | 4.873 | 0.277 |
| 69 | 4.873 | 0.277 |
| 70 | 4.873 | 0.277 |
| 71 | 4.872 | 0.277 |
| 72 | 4.877 | 0.277 |
| 73 | 4.876 | 0.277 |
| 74 | 4.876 | 0.277 |
| 75 | 4.876 | 0.277 |
| 76 | 4.881 | 0.277 |
| 77 | 4.879 | 0.277 |
| 78 | 4.884 | 0.277 |

Each sample was mixed for one minute and then applied in sequence to UHMW peel adherends, HDPE peel adherends, and HDPE overlap shear adherends. Upon completion of the 24-hour cure cycle, bond strength and solvent resistance were determined.

TABLE XXI

| | Bond Strength | | | | | | Solvent Resistance |
|---|---|---|---|---|---|---|---|
| | UHMW PE | | HDPE | | | | % |
| | T-Peel | | T-Peel | | Overlap Shear | | Insoluble |
| Ex. | piw | N/cm | piw | N/cm | psi | MPa | Solids |
| 65 | 29 | 51.0 | 45 | 79.2 | 846 | 5.83 | 66 |
| 66 | 23 | 40.5 | 44 | 77.4 | 967 | 6.66 | 67 |

TABLE XXI-continued

| | Bond Strength | | | | | Solvent Resistance |
| | UHMW PE | | HDPE | | | % |
| | T-Peel | | T-Peel | | Overlap Shear | Insoluble |
| Ex. | piw | N/cm | piw | N/cm | psi | MPa | Solids |
|---|---|---|---|---|---|---|---|
| 67 | 29 | 51.0 | 44 | 77.4 | 818 | 5.64 | 19 |
| 68 | 24 | 42.2 | 39 | 68.6 | 923 | 6.36 | 79 |
| 69 | 27 | 47.5 | 51(T) | 89.8(T) | 1,008 | 6.95 | 75 |
| 70 | 24 | 42.2 | 38 | 66.9 | 999 | 6.88 | 66 |
| 71 | 25 | 44.0 | 44 | 77.4 | 985 | 6.79 | 74 |
| 72 | 22 | 38.7 | 42 | 73.9 | 961 | 6.62 | 78 |
| 73 | 27 | 47.5 | 48(T) | 84.5(T) | 825 | 5.68 | 79 |
| 74 | 26 | 46.8 | 48 | 84.5 | 825 | 5.68 | 71 |
| 75 | 26 | 46.8 | 50 | 88.0 | 814 | 5.61 | 68 |
| 76 | 28 | 49.3 | 51 | 89.8 | 836 | 5.76 | 79 |
| 77 | 27 | 47.5 | 46 | 81.0 | 810 | 5.58 | 65 |
| 78 | 24 | 42.2 | 38 | 66.9 | 679 | 4.68 | 75 |

(T) = Adherend tore

Various modifications and alterations of this invention will become apparent to those skilled in the art without departing from the scope and spirit of the invention. It should be understood that this invention is not limited to the illustrative embodiments set forth herein.

What is claimed is:

1. A method of initiating polymerization, comprising:
   providing a complexed initiator; and
   reacting a decomplexer with the complexed initiator, the decomplexer having a structure represented by (I):

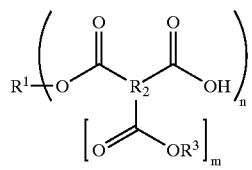

(I)

wherein:
   $R^1$ is selected from the group consisting of hydrogen, a monovalent organic group, and a multivalent organic group;
   $R^2$ is a multivalent organic group;
   $R^3$ is selected from the group consisting of hydrogen and a monovalent organic group;
   m is an integer of 0–2; and
   n is an integer greater than or equal to one.

2. The method of claim 1, wherein the decomplexer is a dicarboxylic acid decomplexer.

3. The method of claim 1, wherein the decomplexer is a carboxylic acid ester decomplexer.

4. An initiator system capable of initiating polymerization, comprising:
   a complexed initiator;
   a carboxylic acid decomplexer of claim 1; and
   a second decomplexer.

5. The initiator system of claim 4, wherein the second decomplexer comprises an anhydride decomplexer.

6. The initiator system of claim 5, wherein the second decomplexer is selected from the group consisting of methacrylic anhydride, succinic anhydride, maleic anhydride, and glutaric anhydride.

7. An initiator system of claim 1, wherein the complexed initiator is an organoborane amine complex.

8. A kit comprising:
   a polymerizable composition, wherein the polymerizable composition comprises:
      at least one polymerizable monomer, and
      a first decomplexer, comprising a carboxylic acid decomplexer having a structure represented by (I):

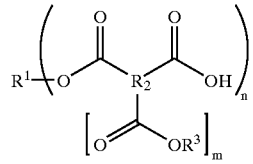

(I)

wherein:
   $R^1$ is selected from the group consisting of hydrogen, a monovalent organic group, and a multivalent organic group;
   $R^2$ is a multivalent organic group;
   $R^3$ is selected from the group consisting of hydrogen and a monovalent organic group;
   m is an integer of 0–2;
   n is an integer greater than or equal to one;
   a second decomplexer; and
   an initiator component, wherein the initiator component comprises:
      a complexed initiator, and
      an optional diluent.

9. The kit according to claim 8, wherein the second decomplexer comprises an anhydride decomplexer.

10. The kit according to claim 8, wherein the second decomplexer is selected from the group consisting of methacrylic anhydride, succinic anhydride, maleic anhydride, and glutaric anhydride.

11. The kit according to claim 8, further comprising a multi-part dispenser.

12. The method of claim 1 wherein the complexed initiator and the decomplexer react in the presence of at least one polymerizable monomer in order to form a polymerized composition.

* * * * *

UNITED STATES PATENT AND TRADEMARK OFFICE
CERTIFICATE OF CORRECTION

| | |
|---|---|
| PATENT NO. | : 6,812,308 B2 |
| APPLICATION NO. | : 10/348237 |
| DATED | : November 2, 2004 |
| INVENTOR(S) | : Deviny, Edward J. |

It is certified that error appears in the above-identified patent and that said Letters Patent is hereby corrected as shown below:

Title Page
Column 2, Delete the second occurrence of:

Primary Examiner—Tatyana Zalukaeva
(74) Attorney; Agent, or Firm—Scott A. Bardell

[57]  ABSTRACT

Initiator systems of the present invention include both a complexed initiator and a carboxylic acid decomplexer. For example, dicarboxylic acid decomplexer, carboxylic acid ester decomplexers, and monocarboxylic acid decomplexers (preferably those comprising an alkyl group having at least nine carbon atoms for low odor compositions) are useful in the present invention.

12 Claims, No Drawings

[56] Item
Page 2, Column 1, Under FOREIGN PATENT DOCUMENTS, please add the following reference that was considered by the Examiner, but does not appear on the printed patent:
  JP 42-14318

Page 2, Column 2, Under OTHER PUBLICATIONS, Line 3, Delete "Polymre" and insert -- Polymer -- therefor.

Page 3, Column 1, Under OTHER PUBLICATIONS, Line 6, Delete "Insitute" and insert -- Institute -- therefor.

Page 3, Column 1, Under OTHER PUBLICATIONS, Line 40, Delete "Cronejo" and insert -- Cornejo -- therefor.

Page 3, Column 2, Under OTHER PUBLICATIONS, Line 42, Delete "Abstrcts" and insert -- Abstracts -- therefor.

Page 3, Column 2, Under OTHER PUBLICATIONS, Line 48, Delete "(1985))" and insert -- (1985) -- therefor.

UNITED STATES PATENT AND TRADEMARK OFFICE
CERTIFICATE OF CORRECTION

PATENT NO. : 6,812,308 B2
APPLICATION NO. : 10/348237
DATED : November 2, 2004
INVENTOR(S) : Deviny, Edward J.

It is certified that error appears in the above-identified patent and that said Letters Patent is hereby corrected as shown below:

<u>Column 1</u>
Line 6, Delete "anandoned" and insert -- abandoned -- therefor.

<u>Column 2</u>
Line 28, Delete "W097/07171" and insert --WO97/07171 -- therefor.

<u>Column 16</u>
Line 33, Delete "17-static" and insert -- 17-stage static -- therefor.
Line 34, After "ConProTec" insert -- ; --.

Signed and Sealed this

Twenty-ninth Day of August, 2006

JON W. DUDAS
*Director of the United States Patent and Trademark Office*